United States Patent [19]

Constant

[11] 4,117,481
[45] Sep. 26, 1978

[54] SIDELOOKING RADAR AND SYSTEM FOR IDENTIFYING OBJECTS

[76] Inventor: James Nickolas Constant, 1603 Danbury Dr., Clarmont, Calif. 91711

[21] Appl. No.: 777,763

[22] Filed: Mar. 15, 1977

Related U.S. Application Data

[63] Continuation-in-part of Ser. No. 257,932, May 30, 1972, abandoned.

[51] Int. Cl.² .............................................. G01S 9/56
[52] U.S. Cl. ............................................... 343/6.5 SS
[58] Field of Search ................................... 343/6.5 SS

[56] References Cited

U.S. PATENT DOCUMENTS

| | | | |
|---|---|---|---|
| 3,172,101 | 3/1965 | Kingsford-Smith | 343/6.5 SS |
| 3,172,102 | 3/1965 | Chapman | 343/6.5 SS X |
| 3,247,509 | 4/1966 | Hamann et al. | 343/6.5 SS |
| 3,293,642 | 12/1966 | Gieles | 343/6.5 SS |
| 3,521,280 | 7/1970 | Janco et al. | 343/6.5 SS X |
| 3,691,557 | 9/1972 | Constant | 343/6.5 SS |
| 3,737,911 | 6/1973 | Sakuragz et al. | 343/6.5 SS |
| 3,745,569 | 7/1973 | Works et al. | 343/6.5 SS |
| 3,768,096 | 10/1973 | Dentino | 343/5 CM X |

*Primary Examiner*—Malcolm F. Hubler
*Attorney, Agent, or Firm*—Harris, Kern, Wallen & Tinsley

[57] ABSTRACT

A radar which can be used in a system for identifying coded objects. A passive encoding array (label) for an object and having dipoles at selected dipole locations in the array, and a radar for scanning the array as it crosses the radar beam. The radar utilizes a doppler receiver and a matched filter processor to detect one of doppler, FM, and AM modulated FM signals from crossing targets. The radar output is a pulse code with pulses corresponding to the dipoles of arrays illuminated by the radar.

30 Claims, 5 Drawing Figures

SIDELOOKING RADAR AND SYSTEM FOR IDENTIFYING OBJECTS

CROSS REFERENCE TO RELATED APPLICATIONS

This application is a continuation-in-part of my copending application Ser. No. 257,932, filed May 30, 1972, now abandoned, and a distinct invention based on an invention disclosed in application Ser. No. 870,598 filed Sept. 22, 1969, now U.S. Pat. No. 3,691,557.

BACKGROUND OF THE INVENTION

This invention relates to the identification of objects which have been encoded and more particularly to the identification of objects using radar techniques in which the object being examined moves relative to the radar source and is passively or actively encoded.

In many instances it is desirable to identify a particular object. Typical examples are in the fields of transportation, manufacturing, inventory control, postal sorting, etc. In these fields it often happens that the objects are of like kind and are either indistinguishable, too numerous or separated in distance to be rapidly identified using conventional means. Therefore, a suitable label such as an encoding array, must be provided to accomplish their rapid identification. The encoding array permits the object being examined by a reader (radar) to be identified using conventional radar techniques.

Examples of encoding array labels presently in use are based on electromagnetic principles for their operation. In each case readers are used to detect and decode the information in the label. In each of these types of devices, including both the label and the reader, the main criteria which determine their effectiveness are physical size, weight, power consumption, cost, etc., contrast and resolution. The physical size of the label, for example, determines to a great extent the physical size, weight, power consumption, and cost etc., of the reader. Since the label must be smaller than the object to which it is attached, the reader must be compatible to insure readibility, efficiency, and economy of its use. Contrast is a term which denotes the ability of the reader to detect the label and determine its code in the general presence of influences or reflections from the object itself. The term resolution is most frequently used to denote the smallest extension within the encoded array label which the reader is able to separate or differentiate.

Two examples of labeling systems presently in use are based on simple radars used to read the polarization or resonant frequency of elements in the label and, as disclosed in my copending application, using coherent synthetic aperture radar to read the label elements. In a system using simple radar the reader size, weight, power consumption, cost, etc., the contrast and resolution are severely limited by the range between the label and reader, and by the wavelength and aperture size employed by the reader. The simple radar system, therefore, has the potential to achieve fine range resolution but appears to be constrained to relatively poor azimuthal or angular resolution especially at long operating ranges. As I have pointed out in my copending application, a coherent radar which utilizes the principle of synthetic aperture is not burdened by the parameters of wavelength, range, and aperture dimension and can operate at any frequency, practical range, thus providing capabilities over simple radars.

SUMMARY OF THE INVENTION

The present invention is directed to radar and labeling systems which provide capabilities over the synthetic aperture system. These systems utilize principles of both coherent systems using doppler and coherent systems using synthetic aperture. They may be viewed therefore as hybrid systems which employ the best features of coherent systems to produce highly efficient radar and labeling systems.

Utilizing the system of the present invention, data may be obtained from an object which will permit its identification in a more efficient manner than is possible using the simple radar or the coherent synthetic aperture. The term efficiency refers to the degree of measure of the complexity, size, weight, power consumption, cost, etc., of a given system.

It is therefore an objective of this invention to provide a radar which implements receiver and processor means to detect signals from crossing targets.

Another objective of this invention is to provide a system capable of identifying objects using labels.

Another objective of this invention is to provide efficient radar and labeling systems having high contrasting and resolving powers.

A further objective of this invention is to provide an efficient label which can be attached to the object being examined.

Other objectives of the present invention will become more apparent upon consideration of the following specifications and annexed drawings, in which:

DESCRIPTION OF THE PREFERRED EMBODIMENTS

FIGS. 1 through 4 are identical to those of my copending application; the difference being the manner in which the systems of the present invention and copending application implement their receivers 6 and processors 8.

Figure 1:
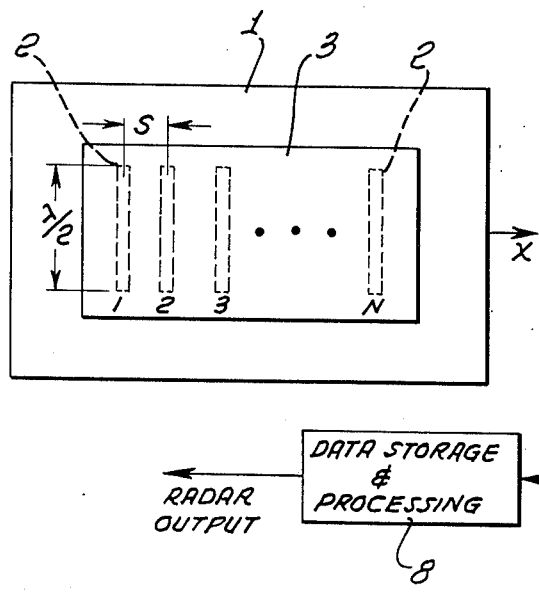
FIG. 1 is a detailed top view of the label shown as an encoded array of dipoles.

In order to describe the label reference is made to FIG. 1. Attached to the object being examined 1 is one possible configuration of this invention shown as an array of metallic dipoles 2 embedded in a suitable dielectric material 3. Other possible configurations for this invention may be etched metallic lines on a dielectric base, printed metallic lines on a painted dielectric, or slots in metal. Thus the label 3 consists of an array of dipoles 2 attached, imprinted, or cut onto the vehicle or product. In single frequency codes the dipoles may have varied lengths indicative of amplitude coding for each dipole while in multifrequency codes the dipoles may have varied lengths indicative of both amplitude and frequency coding for each dipole. Minimum dipole lengths are $\lambda/2$ where $\lambda$ is the wavelength at which the radar operates. The spacing $s$ between dipoles is determined by the radar resolving power. The height $h$ of dipoles above the object 1 being examined (not shown in the figure) and the nature of the dielecctric material 3 are determined by well known considerations of contrast between encoding array dipoles 2 and the object being examined 1, when both are simultaneously illuminated by the radar. The number of dipole locations $N = n \times m$ where $n$ is the number of information digits and $m$ is the number of redundant digits in the particular error detecting and correcting coding scheme employed. The number of dipoles which actually occupy locations in the encoding array is $M \leq N$ according to the particular coding assignment which is used to identify the object being observed. Thus although N dipole locations are available, in general, some dipole locations will be vacant of dipoles in a given label. Non-metallic objects 1 are encoded by attaching, printing, or painting the label directly upon the object's surface while metallic objects 1 require either the use of special adaptors or isolators of height $h$ to isolate the dipole from the object's conducting surface or the use of punched slots or bars directly onto the surface. The dipoles can be made of simple wires, foil, die punched slots, metallic ink imprints, etc., and can be premanufactured and applied permanently or can be made removable. It will be appreciated that dipoles 2 may take forms other than the fundamental reflector just disclosed, for example dipoles 2 may reflect a harmonic or subcarrier frequency of their fundamental illumination or these may be programmed to reflect an amplitude, frequency or phase modulation of their illumination. Moreover, the illumination of dipoles 2 may be continuous wave or an amplitude, frequency or phase modulation of a continuous wave.

Figure 2:
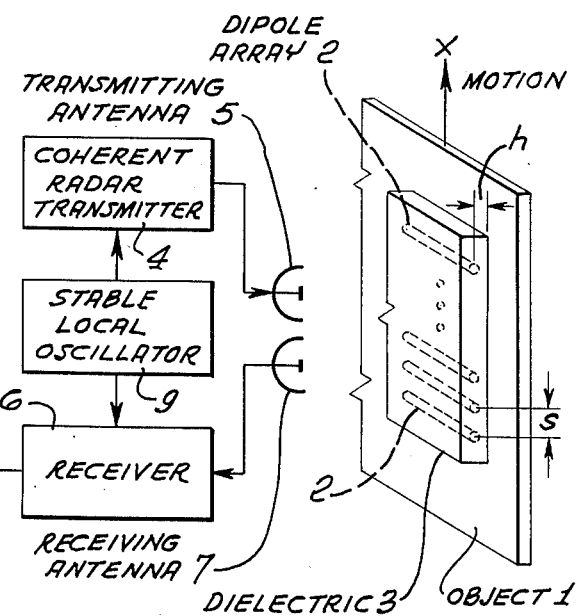
FIG. 2 is a block diagram of a radar system which employs the label.

Referring to FIG. 2 the labeling system in a preferable configuration consists of the object being observed 1, dipole array 2, dielectric 3, radar transmitter 4, transmitting antenna 5, receiver 6, receiving antenna 7, and data processor 8. The first three times constitute the encoded array label while the remaining items collectively constitute a radar which is implemented using well known radar components. A stable oscillator 9 serves as a common reference source for both the transmitter and the receiver; i.e., the radar is coherent. The radar may be one of any number of types. In particular, the functions of the transmitting and receiving portions of the radar can be shared as, for example, when the system operates as an oscillator/mixer using a single antenna rather than the dual antenna configuration illustrated by the figure. The transmitter 4 produces a signal having a frequency which is located in the microwave, millimeter, or optical band portions of the electromagnetic spectrum or in the acoustic spectrum. The frequency of the transmitter is single tone or multitone and is preferably fixed. The exact frequency or frequencies used in any one case is determined by the application at hand. Any of the well known types of acoustic, microwave or optical frequency transmitters capable of producing oscillations at the needed frequencies may be utilized, the particular type of oscillator and associated circuits forming no part of the present invention. The receiving antenna 7 and receiver 6 capture a portion of the energy reflected from each dipole 2 in the label and produce signals at the output of the receiver 6 indicative of the presence or absense of dipoles 2. The receiver 6 is a doppler receiver having therefore a plurality of filters or channels. The exact specification for the receiver 6 is determined by the application at hand. Any of the well known types of doppler receivers capable of producing the desired output signals may be utilized, the particular type of receiver and associated circuits forming no part of the present invention. The data processor 8 receives the output data from the receiver 6 and will process and decode the information provided by the label and receiver. The data processor may be a frequency or period counter, matched filter, correlator, or computer its exact specification being determined by the application at hand. Any of the well known types of electronic hardware or software or optical data processors capable of producing the desired functions or signals may be utilized, the particular type of data processor and associated circuits forming no part of the present invention.

The object being observed 1 moves in the azimuthal direction $x$ relative to the radar and has velocity $v$. Each dipole 2 in the encoded array is illuminated by the transmitting antenna 5 and in turn reflects energy in the direction of the receiving antenna 7. Each dipole 2 crossing the beam formed by antennas 5 and 7 will therefore produce a pulse of duration T and bandwidth B at the input to the receiver 6.

$$T = L/V \qquad (1)$$

$$B = 2vL/\lambda R_m \qquad (2)$$

where
$L$ = length of object 1 path illuminated by antennas 5 and 7
$v$ = object 1 speed in direction $x$
$\lambda$ = wavelength
$R_m$ = maximum slant range of illumination The pulse defined by equations (1) and (2) is a simple frequency modulated (FM) chirp signal. Other modulation types may be produced if the transmitter 4 is itself modulated. The pulse may be processed through the receiver 6 and data processor 8 in three ways; to generate in 6 and process in 8 one of a plurality of doppler signals, synthetic aperture signals or AM modulated FM signals. In my copending application I have disclosed the manner and detail of implementing a synthetic aperture radar to obtain the practical benefits of independence from range and wavelength with convenient small size antennas. In the synthetic aperture radar of my copending application, the receiver 6 is sufficiently wideband to receive the pulse of duration T and bandwidth B, given by equations (1) and (2), and processor 8 is for processing signals of duration T and bandwidth B. In the present application I will disclose more fully the manner and detail of implementing the system of the invention to obtain further benefits in many applications.

Briefly, in the radar of the present invention, receiver 6 is a bank of narrowband doppler filters each receiving a small fraction T/N of the pulse of duration T, and processor 8 is for processing signals as one of individual signals from each doppler filter or a signal formed by connecting the output of doppler filters to a common line.

Figure 3:
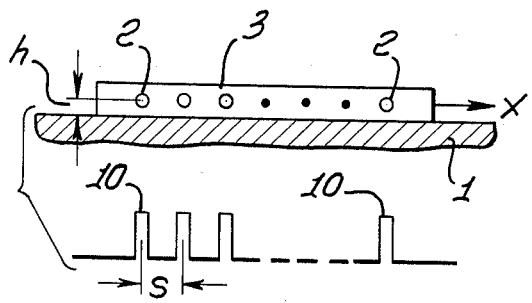
FIG. 3 is a time plot which illustrates the relationships existing between elements (dipoles) within the label and radar output pulses.

In order to describe the nature of the signal, at the radar output, which results from the motion of the label and its direction by the radar reference is made to FIG. 3. It is a well known fact, especially in a synthetic aperture radar, that the doppler shift $f_d$ is proportional to the distance $x$ between the target (dipole) and the radar line of sight. Mathematically, $$f_d = 2vx/\lambda R \quad (3)$$

where
 $v$ = object 1 speed in direction $x$
 $x$ = distance from the radar line of sight along direction $x$
 $\lambda$ = wavelength
 $R$ = range Therefore, the doppler shift $f_d$ is a linear function of $x \leq L/2$ where L is the maximum length of path illuminated by the radar along direction $x$. The instantaneous radar signals each with doppler shift $f_d$ can be detected in one or more doppler filters in the preferred manner of the present invention or, as specified in my copending application, can be stored and then collectively processed following a period of time T. In either case, if the object being observed 1, with attached dipole array 2, moves in a direction perpendicular to the radar line of sight in the azimuthal direction $x$, and is illuminated and observed by the radar it will as a matter of fact result in a pulse appearing at the radar output for each non-vacant location in the label. Thus a digital pulse code 10 which indicates the precise code employed in the label and conveying the needed information, appears at the radar output. In the synthetic aperture system of my copending application, the individual pulses 10 appear serially in time while in the system of the present invention, the individual pulses 10 may appear simultaneously or serially in time at the radar output; pulses 10 appear simultaneously when receiver 6 and processor 8 generate and process a plurality of doppler and chirp-doppler signals in parallel, while pulses 10 appear serially when receiver 6 and processor 8 generate and process AM modulated FM signals in series.

Figure 4:
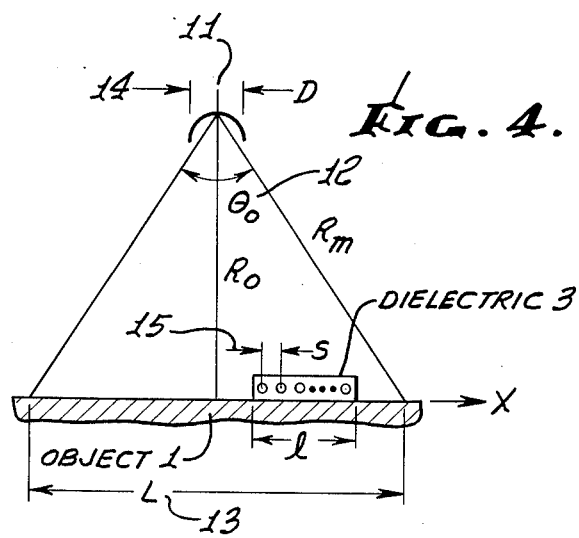
FIG. 4 is a description of the basic system geometry.

The basic geometry of the system operation is described in FIG. 4. The dipole array 2 moves in the azimuthal direction $x$ relative to the radar 11. $R_o$ is the shortest slant range of approach between the encoding array and the radar and $R_m$ is the maximum slant range which is being illuminated. The slant range resolution is given by the well known formula $$\rho R = c\tau/2 \quad (4)$$

where
 $c$ = velocity of light
 $\tau$ = pulsewidth

In a simple pulsed radar, the generation of a pulse $\tau$ seconds requires a transmitter bandwidth of the order $W = 1/\tau$ and preservation of the range resolution requires that the receiver also have bandwidth $W = 1/\tau$. The key to achieving fine range resolution is wideband radar transmitters and receivers, a well known fact in pulse compression technology. If on the other hand a simple radar has a half power angular beamwidth of $\theta_o$ 12 radians then the illuminated width or length of object path at range $R_o$, L13, is:

$$L = \theta_o R_o \quad (5)$$

If the distance L13 is accepted as a measure of the along track resolution and therefore determining the spacing $s$ of dipoles 2 for the simple radar, then the only recourse for achieving fine resolution is to make either $\theta_o$ or $R_o$ very small. But, an antenna aperture with along track dimension D14, operating at its diffraction limit at wavelength $\tau$, yields a half power beamwidth of $$\theta_o = \lambda/D \quad (6)$$

Therefore, the spacing for dipoles in the case for a simple radar is:

$$s = \lambda R_o/D \quad (7)$$

To keep the spacing $s$ 15 small, D must be increased and/or $\lambda$ and $R_o$ must be decreased. Each of these options become unattractive beyond certain limits. Large D antennas are both costly and physically incompatible in many applications, operation at very short wavelength leads to weather limitations in many cases, and operation at very short range is either limited by the transmitter "on-time" or may not be compatible in many applications. The simple radar system therefore has the potential to achieve fine range resolution using heavy and costly equipment but appears to be constrained to relatively poor azimuthal resolution especially at long operating ranges and wavelengths. One way to improve the system performance, disclosed in my copending application, is the use of the synthetic aperture technique to greatly improve azimuthal resolution and reduce the size of the transmitter, receiver, and antenna. The other way to improve the system performance with like results is the system of the present invention. Thus, neither the simple radar nor the synthetic radar are preferable configurations in this invention. In the simple radar the distance $s$ and therefore the length $l$ of the encoding array exceed the distance L, while in the system of the present invention and in the synthetic aperture radar of my copending application $s$ and $l$ are generally less than the distance L. However, in many applications using the system of the present invention the length $l$ of the encoding array may equal the distance L, the exact relationship between $l$ and L being determined by the application.

Figure 5:
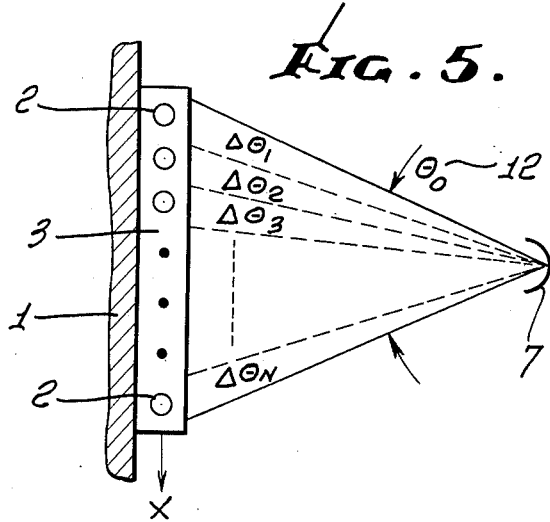
FIG. 5 is a block diagram illustrating a portion of the system of FIG. 2.

Referring to FIG. 5, in the technique of the present invention the physical antenna is regarded as generating a series of small beams $\Delta\theta_1, \Delta\theta_2, \ldots \Delta\theta_N$, the totality of which are included within the angular beamwidth $\theta_o$ 12. The actual number N of small beams $\Delta\theta_1, \Delta\theta_2, \ldots, \Delta\theta_N$, representing elements of beam 12, corresponds to the number N of doppler filters $D_1, D_2, \ldots D_N$ which can be implemented in receiver 6. For example, if a doppler filter D having bandwidth $\Delta f \leq B$ is selected in the receiver 6 then the width of its corresponding "beam" in the series of small beams is given by:

$$\Delta\theta = \Delta f/B \, \theta_o \quad (8)$$

where
 $\Delta f$ = bandwidth of doppler filter
 $\Delta\theta$ = beamwidth of "beam" corresponding to $\Delta f$
 B = signal bandwidth
 $\theta_o$ = beamwidth of physical antenna; corresponds to B Therefore, the spacing of dipoles for the doppler radar case of the present invention is:

$$\text{,Ti } s = \Delta f/B \cdot \lambda R_o/D \quad (9)$$

In my copending application I have demonstrated the spacing for dipoles in the case for the synthetic aperture radar as follows:

$$s = D/L \cdot \lambda R_o/D \quad (10)$$

Equations (7), (9) and (10) give the resolving powers for the simple, doppler, and synthetic radars. A comparison of these equations yields the fact that the along track resolution and consequently the spacing s of dipoles improves significantly when using the doppler and synthetic radars. Furthermore, if the doppler filter is set to meet the following condition:

$$\Delta f/B = D/L \qquad (11)$$

the doppler and synthetic radar techniques of the present and copending applications provide the same resolving power, namely, $$s = D \qquad (12)$$

Unfortunately, the condition imposed by equation (11) can be met only at short range. This can be seen by solving equation (11) for $\Delta f$ and using equation (2). Thus, $$\Delta f = 2vD/\lambda R_m \qquad (13)$$

Therefore, the filter bandwidth will decrease at long range. In fact it will exceed the availability of a practical filter at some range. Unlike the synthetic aperture system of my copending application, whose filter bandwidth is given by equation (2), there is no compensating increase in D offsetting the increase $R_m$, i.e., $D/R_m$ in equation (13) is range dependent while $L/R_m$ in equation (2) is range independent. However, the system of the present invention may compensate the range by increasing the speed $v$, increasing the physical size of the antenna D, or decreasing the wavelength $\lambda$ these conditions being reminiscent of conditions which limit the performance of the simple radar.

It should be recognized that whereas the doppler and synthetic aperture systems of the present and copending applications by a far margin exceed the capabilities of simple radar systems, the doppler system of the present invention provides capabilities over the synthetic aperture system at short range since in the former system the receiver 6 and data processor 8 may be implemented using a simple bank of doppler filters followed by a simple decoder, while the latter system requires an analog or digital pulse compression receiver and processor; the former is easier to implement, i.e., has the least complexity, size, weight, power requirements, cost, etc.

Using the doppler radar technique of the present invention, therefore, allows for both the significant improvement in the resolution or spacing of dipoles s in the encoding array and the reduction in the size of components, especially those for the receiver 6 and data processor 8 when compared in many applications to the simple and synthetic aperture radar techniques. The shortening of dipole spacing is accomplished in the manner of synthetic aperture, i.e., by reducing the antenna dimension D while the reduction in the size of the receiver 6 and data processor 8 is accomplished using simple doppler filters in the receiver 6 and simple decoder in the data processor 8. These steps are opposite those taken in the simple radar and in many applications more efficient than those taken in the synthetic aperture radar techniques.

In operation, a dipole 2 which transits beam 12 will transit small beams $\Delta\theta_1$, $\Gamma\theta_2$, ..., $\Delta\theta_N$ in succession and will therefore produce pulses in succession at the outputs of doppler filters $D_1$, $D_2$, ..., $D_N$. At any instant of time, dipoles 2 present in beam 12 will produce pulses at the outputs of selected ones of doppler filters $D_1$, $D_2$, ..., $D_N$ corresponding to small beams $\Delta\theta_1$, $\Delta\theta_2$, ..., $\Delta\theta_N$ in which dipoles 2 are present. When the encoding array is properly positioned in beam 12, then the pulses 10 appearing at the output of receiver 6 will be inputted to signal processor 8 which recognizes the code of pulses 10 and passes this code to the radar output as a legitimate reading. Thus, signal processor 8 responds selectively only to the presence of a legitimate code at its input, i.e., for a properly positioned encoding array in beam 12. Since the number of dipoles which actually occupy locations in the encoding array is $M \leq N$, only M of the small beams $\Delta\theta$ and corresponding doppler filters D will be indicating pulses at the proper instant.

Each small beam $\Delta\theta$ and its corresponding doppler filter D forms a frequency channel of the system of the invention, each frequency channel being separated from other frequency channels by the different doppler frequencies in the channels. The output, therefore, of a doppler filter D is at a predetermined carrier frequency appropriately shifted by the doppler frequency for that channel. The presence and absence of signals at the output of doppler filters D forms the code corresponding to dipoles in the label, i.e., the coded signal at the output of receiver 6 is a plurality of pulses appearing simultaneously in time with each pulse having a predetermined carrier frequency appropriately shifted by doppler. Frequencies from doppler filters D can be individually detected as pulses and the pulses can then be decoded in processor 8.

In this regard, the system of the invention operates as a conventional doppler radar for simultaneously detecting the doppler frequencies from dipoles in a label crossing the radar beam. In contrast, the system of my copending application operates as a conventional synthetic aperture radar for serially detecting chirp signals from dipoles in a label crossing the radar beam. It will be appreciated, therefore, that in a second alternative embodiment of the invention, each individual frequency channel of the system may operate in the manner of my copending application, i.e., as a synthetic aperture radar. In this case, the output of a doppler filter D is a chirp signal at a predetermined carrier frequency appropriately shifted by the doppler frequency for that channel. Chirp signals from doppler filters D can be individually processed into pulses and the pulses can then be decoded in processor 8.

Thus, a distinguishing feature of the present invention is its implementation of a receiver 6 having a plurality of doppler channels, each channel having a predetermined carrier frequency, bandwidth and time duration. In particular, it will be appreciated that doppler filters D can be implemented alternatively as a single swept filter or as a Fourier analyzer, the particular illustration of FIG. 5 as a bank of fixed doppler filters being merely shown by way of example. A signal flashes through a given channel as a result of one of the following, first, following the transit of a single dipole, second, following signaling by the dipole at the appropriate signaling frequency, bandwidth and time duration provided by well known amplitude, frequency or phase modulation of its carrier and, third, following signaling by the transmitter via the dipole.

Another distinguishing feature of the invention is its implementation of a processor 8 including means for processing and decoding signals from receiver 6 in the form of one of a plurality of doppler or chirp-doppler signals. Yet a third embodiment of the present invention is possible in which receiver 6 provides an AM modulated chirp signal to processor 8 for each dipole 2 crossing beam $\theta_o$ 12.

A dipole 2 which transits beam $\theta_o$ produces a frequency modulated (FM) chirp signal, whose bandwidth B is given by equation (2), at the output of receiving antenna 7 and input to receiver 6 while a dipole 2 which transits a small beam $\Delta\theta$ produces a frequency modulated (FM) chirp signal, whose bandwidth $\Delta f$ is given by equation (13), at the output of filter D corresponding to small beam $\Delta\theta$. Thus, each small beam $\Delta\theta$ and its corresponding doppler filter D form a frequency channel of the system of the invention whose frequency is $f + f_D$ where $f$ is the fundamental, harmonic or subcarrier frequency reflected by the dipole and $f_D$ is the doppler frequency, given by equation (3), and whose bandwidth $\Delta f$ is given by equation (13), each frequency channel therefore being separated from other frequency channels by the different doppler frequencies of equation (3) in the different channels. The output therefore of a doppler filter D at a predetermined frequency $f$ shifted by the doppler frequency $f_D$ for that channel is at a carrier $f + f_D$ and has bandwidth $\Delta f$ given by equation (13).

This result permits the operation of the system of the invention in a number of ways. First, the output of each filter D may be used as a doppler signal which may be detected in data processor 8 using a suitable frequency detector and with the plurality of doppler outputs from filters D corresponding to dipoles 2 forming a code. Second, the output of each filter D may be used as a chirp signal which may be compressed in data processor 8 using a matched filter or correlator and with the plurality of chirp-doppler outputs from filters D corresponding to dipoles 2 forming a code. Third, the plurality of filters $D_1, D_2, \ldots, D_N$ may be used to amplitude modulate (AM) the input FM chirp signal of bandwidth B from each dipole 2 crossing beam $\theta_o$ and whose corresponding doppler frequency $f_D$ sweeps by filters D in time sequence and thereby produces an AM modulated FM signal at the output of receiver 6 and wherein the AM is produced by amplitude and phase weighting of filters D as desired.

For example, if each filter D is an identically cosine tapered frequency filter, the doppler frequency $f_D$ sweeping by filters D is amplitude modulated (AM) and in fact the AM itself is a chirp signal. The AM chirp signal is available by connecting filter D outputs to a common line and can be processed using a matched filter or correlator in data processor 8, i.e., disregarding the FM carrier chirp and using the AM modulation chirp. Thus, an FM chirp signal of time duration T and bandwidth B which is produced by a single dipole 2 crossing beam $\theta_o$ and appearing at the input to receiver 6 may be outputted from receiver 6 as an FM chirp signal having AM modulation also as a chirp signal and using only the AM chirp signal in data processor 8. More generally, a variety of AM modulated FM chirp signals may be outputted from receiver 6 for a single dipole 2 crossing beam $\theta_o$ and AM modulations may be processed into pulses in processor 8 with the plurality of signals appearing sequentially at the output of receiver 6 corresponding to the sequential crossing of dipoles 2 of beam $\theta_o$ and collectively forming the code and with processor 8 for decoding the code, i.e., for detecting the presence or absence of dipoles 2 in the label.

From the foregoing it will be appreciated that the third alternative embodiment of the invention defines altogether a new type synthetic aperture radar wherein receiver 6 includes doppler filters D for providing AM modulated FM signals to processor 8. In contrast, conventional synthetic aperture radars have wideband receivers 6 for providing FM carrier signals to processor 8, i.e., without the AM modulation feature of the present invention. The importance of this new technique is for changing from FM chirps to AM chirps. In many applications, FM chirps have too great time-bandwidth products to be efficiently processed in processor 8. In such applications, AM chirps of the present invention have more convenient timebandwidth products which can be readily processed (electronically or optically) in processor 8 and in this manner extending the benefits of synthetic aperture to these applications. In general, AM chirps of the present invention will have time duration T given by equation (1) and bandwidth $B' \leq B$ where B is given by equation (2). As a consequence, the third alternative embodiment of the invention just disclosed trades resolving power for efficiency of implementation and this trade is acceptable in many applications otherwise impossible using conventional synthetic aperture. And, of course, the new radar can also be employed to read labels.

In summary, the system of the invention may be implemented to operate each frequency channel comprising small beam $\Delta\theta$ and filter D as a doppler radar, or as a FM chirp-doppler radar, or the plurality of frequency channels may be used for converting FM chirps to AM chirp signals, the exact specification of its operation being determined by the application. In particular, it will be appreciated that the system of the invention can be implemented acoustically and optically as well as at microwave frequencies. For example, a widebeam laser may be used to implement transmitter 4 and antenna 5 in such applications as for reading labels in point-of-sale scanners, optical readers, optical identification, high-speed high-resolution bar code reading, high speed reading of data into computers, and so forth.

Although a particular labeling system has been described, it should be understood that the scope of the invention should not be considered to be limited by the particular embodiment of the invention shown by way of illustration, but rather by the appendant claims.

I claim:

1. A detection system comprising in combination:
a transmitter including a transmitting antenna for generating a first signal of predetermined carrier frequency, time duration and bandwidth;
a receiver including a receiving antenna for receiving first FM signals of predetermined carrier frequency $f$, time duration T and bandwidth B,
each of said first FM signals being the response of one of a transit of a target through the beam of said transmitting antenna, signaling by a target in the beam of said transmitting antenna, and signaling by said transmitter via said target;
a doppler filter bank included in said receiver for detecting each of said first FM signals as one of a plurality of second FM signals of predetermined carrier frequency $f + f_D$, time duration T/N and bandwidth $\Delta f$, each of said second FM signals being obtained from a filter in said doppler filter bank, and an AM modulated FM signal obtained from the combined output of filters in said doppler filter bank, said AM being produced by the spectral response characteristics of filters in said doppler filter bank; and a signal processor having the receiver output as its input and including means for processing and decoding said detected first FM signals.

2. The system of claim 1 wherein said detection system operates at an acoustical frequency.

3. The system of claim 1 wherein said first FM signals are at the fundamental frequency of the transmitter.

4. The system of claim 1 wherein said processor is an electronic processor.

5. The system of claim 1 wherein said processor is an optical processor.

6. The system of claim 1 for identifying objects including:

a plurality of labels, with a label for each object, and with each label including at least one element forming a target for generating at least one of said first FM signals.

7. The system of claim 6 wherein said labels include means for operating the label as an active device.

8. The system of claim 6 wherein said elements of a label are electrical conductors positioned at a dielectric.

9. The system of claim 6 wherein said elements of a label are slots cut into a metal surface.

10. The system of claim 6 wherein said elements of a label are separated from metal surfaces using element isolators.

11. The system of claim 6 wherein the spacing of element locations of a label for a system operating at a particular wavelength and frequency is substantially equal to the antenna aperture along the path of relative motion of antenna and label.

12. The system of claim 6 wherein said elements are disposed substantially parallel to each other and are of a length substantially equal to one-half the wavelength of the operating frequency of the transmitter output.

13. The system of claim 6 wherein the spacing of element locations is substantially a linear dependence of the antenna aperture along the path of relative motion of the antenna and label and is substantially independent of wavelength and range.

14. The system of claim 1 wherein said direction system of a coherent system.

15. The system of claim 1 wherein said detection system operates at a microwave frequency.

16. The system of claim 1 wherein said detection system operates at an optical frequency.

17. The system of claim 1 wherein said first FM signals are at the harmonic frequency of the transmitter.

18. The system of claim 1 wherein said first FM signals are at the subcarrier frequency of the transmitter.

19. A method of detecting signals, including the steps of:

sending a first signal of predetermined frequency, time duration and bandwidth to a target;

receiving first FM signals of predetermined carrier frequency $f$, time duration T and bandwidth B from said target, each of said first FM signals being the response of one of a transit of a target through the beam of said detection system, signaling by a target in said beam, and signaling by a transmission via a target in said beam;

providing a doppler filter bank for detecting each of said first FM signals as one of a plurality of second FM signals of predetermined carrier frequency $f + f_D$, time duration T/N and bandwidth $\Delta f$, each of said second FM signals being obtained from a filter in said doppler filter bank, and as an AM modulated first FM signal obtained from the combined output of filters in said doppler filter bank, said AM being produced by the spectral response characteristics of filters in said doppler filter bank; and processing and decoding said detected first FM signals from said targets.

20. The method of claim 19 including the step of sending the first signal at an acoustical frequency.

21. The method of claim 19 including the step of sending the first signal at a microwave frequency.

22. The method of claim 19 including the step of sending the first signal at an optical frequency.

23. The method of claim 19 including the step of receiving first FM signals at the fundamental frequency of said first signal.

24. The method of claim 19 including the step of processing detected first FM signals electronically.

25. The method of claim 19 including the step of processing detected first FM signals optically.

26. The method of claim 19 for identifying objects including the step of providing a plurality of labels with one of said labels for each object and with each label including at least one element forming a target for providing said first FM signals.

27. The method of claim 19 including the step of operating the label as an active device.

28. The method of claim 19 including the step of detecting signals coherently.

29. The method of claim 19 including the step of receiving first FM signals at the harmonic frequency of said first signal.

30. The method of claim 14 including the step of receiving first FM signals at the subcarrier frequency of said first signal.

* * * * *